(12) United States Patent
Oka et al.

(10) Patent No.: US 7,524,480 B2
(45) Date of Patent: Apr. 28, 2009

(54) PROCESS FOR PRODUCING MANGANESE FLUORIDE

(75) Inventors: Masakazu Oka, Kawasaki (JP); Naoki Asaga, Kawasaki (JP); Tomoyuki Fukuyo, Kawasaki (JP)

(73) Assignee: Show A Denko K.K., Tokyo (JP)

( * ) Notice: Subject to any disclaimer, the term of this patent is extended or adjusted under 35 U.S.C. 154(b) by 0 days.

(21) Appl. No.: 11/662,189

(22) PCT Filed: Sep. 8, 2005

(86) PCT No.: PCT/JP2005/016986

§ 371 (c)(1),
(2), (4) Date: Mar. 8, 2007

(87) PCT Pub. No.: WO2006/028271

PCT Pub. Date: Mar. 16, 2006

(65) Prior Publication Data

US 2007/0248530 A1    Oct. 25, 2007

Related U.S. Application Data

(60) Provisional application No. 60/610,967, filed on Sep. 20, 2004.

(30) Foreign Application Priority Data

Sep. 10, 2004    (JP) ............................. 2004-264287

(51) Int. Cl.
   *C01G 45/06*    (2006.01)
   *C01B 9/08*    (2006.01)
(52) U.S. Cl. .................... 423/489; 423/491; 423/500; 423/503

(58) Field of Classification Search ................. 423/489, 423/491, 500, 503
See application file for complete search history.

(56) References Cited

U.S. PATENT DOCUMENTS 4,284,617 A * 8/1981 Bowen et al. ............... 423/504

(Continued)

FOREIGN PATENT DOCUMENTS

| SU | 1432001 A1 | 10/1988 |
|---|---|---|
| SU | 1590433 A1 | 7/1990 |
| WO | WO2006/033480 A1 | 3/2006 |

OTHER PUBLICATIONS

Z. Mazej, "Room Termperature Syntheses of $MnF_3$, $MnF_4$ and Hexafluoromanganete (IV) Salts of Alkali Cations", Journal of Fluorine Chemistry, vol. 114, No. 1, Mar. 28, 2002, pp. 75-80, XP004344321.

(Continued)

*Primary Examiner*—Ngoc-Yen M Nguyen
(74) *Attorney, Agent, or Firm*—Sughrue Mion, PLLC

(57) ABSTRACT

Disclosed is a process for producing manganese fluoride, comprising a step (1) of allowing a manganese compound such as $MnF_2$ having been dried at a temperature of not lower than 100° C. to react with a fluorinating agent such as $F_2$ at a temperature of 50 to 250° C. and a step (2) of further allowing a product obtained in the step (1) to react with a fluorinating agent at a temperature of 250 to 450° C. According to this process, manganese fluoride capable of generating a fluorine gas can be easily and inexpensively produced on a mass scale under the conditions of low temperature and low pressure without going through steps of sublimation and solidification.

13 Claims, 4 Drawing Sheets

U.S. PATENT DOCUMENTS

| | | | |
|---|---|---|---|
| 5,363,396 A | 11/1994 | Webb et al. | |
| 2004/0028600 A1* | 2/2004 | Torisu et al. | 423/500 |
| 2006/0099137 A1* | 5/2006 | Barabanov et al. | 423/464 |

OTHER PUBLICATIONS

E. G. Rakov, et al, "Synthesis of Manganese Tetrafluoride at Atmospheric Pressure", 129:2246 CA, 1988, XP002358235.

Database WPI, Derwent Publications LTD., London, GB; AN 1989-112672, XP002378548 Abstracting SU 1 428 702 A Oct. 7, 1988.

R. Hoppe, et al., "Manganese Tetrafluoride", Angewandte Chemie. International Edition, VCH Verlag, Weinheim, DE, vol. 2, No. 4, 1963, p. 222, col. 2, XP002358210.

R. Hoppe, et al, "Mangantetrafluorid" Justus Liebigs Annalen der Chimie, vol. 658, 1962, pp. 1-5, XP002378546.

\* cited by examiner

PROCESS FOR PRODUCING MANGANESE FLUORIDE

CROSS REFERENCES OF RELATED APPLICATION

This application is an application filed under 35 U.S.C. §111(a) claiming benefit pursuant to 35 U.S.C. §119(e) of the filing date of Provisional Application 60/610,967 filed on Sep. 20, 2004, pursuant to 35 U.S.C. §111(b).

TECHNICAL FIELD

The present invention relates to a process for producing manganese fluoride with excellent safety and productivity.

BACKGROUND ART

Utilizing its properties, a fluorine gas has been employed in an etching process or a cleaning process in the field of electronic industry or has been employed for fluorination of inorganic compounds or organic compounds in recent years. The fluorine gas, however, is a combustion supporting gas having extremely strong oxidizing properties, and exhibits high toxicity and corrosive properties, so that care must be taken in handling. Further, it is known that purification by distillation in the production of a fluorine gas is difficult.

As a method to feed a fluorine gas safely, a "halogen generator" that generates a fluorine gas by heating a fluorine compound has been proposed (see, for example, U.S. Pat. No. 5,363,396).

In SU-A-1432001, a process for producing a purified fluorine gas using $MnF_4$ is disclosed. More specifically, a process wherein $MnF_4$ formed by the reaction of $MnF_3$ with a fluorine gas in a stream of a fluorine gas at 450 to 650° C. is sublimated, then the sublimated $MnF_4$ is solidificated at a temperature of not higher than 70° C. to obtain $MnF_4$, and the resulting $MnF_4$ is heated to a temperature of 70 to 300° C., that is, a process for producing a purified fluorine gas in accordance with the reaction formula $MnF_4 \rightarrow MnF_3 + \frac{1}{2}F_2$ is described.

In this process, however, there are problems that synthesis of $MnF_4$ is infeasible unless a complicated apparatus capable of performing thermal sublimation and capture of the sublimated $MnF_4$ is used, and mass production is difficult because steps of sublimation and solidification must be carried out.

In order to produce $MnF_4$ without going through the steps of sublimation and solidification, the present inventors attempted a process for synthesizing $MnF_4$ through $MnF_3$ by allowing $MnF_2$ to react with a fluorine gas (reaction formula: $MnF_2 + F_2 \rightarrow MnF_4$). However, if the $MnF_2$ is only brought into contact with a fluorine gas to perform reaction, $MnF_2$ is fused like glass and the reaction does not proceed, so that it is difficult to produce $MnF_4$. If the pressure is raised, the reaction to form $MnF_4$ proceeds, but a pressure-resistant container capable of using a fluorine gas at high temperatures and high pressure is very expensive, and as a result, the synthesized $MnF_4$ becomes expensive. On this account, development of a process capable of performing the reaction at a temperature and a pressure as low as possible has been desired.

DISCLOSURE OF INVENTION

It is an object of the present invention to develop a process for producing manganese fluoride by which manganese fluoride capable of generating a fluorine gas can be easily and inexpensively produced on a mass scale under the conditions of low temperature and low pressure without going through steps of sublimation and solidification.

In order to solve the above problems, the present inventors have earnestly studied, and as a result, they have found that the above problems can be solved by a process for producing manganese fluoride ($MnF_x$ (x=3–4)) utilizing a reaction of a manganese compound with a fluorinating agent, in which a step (1) of bringing a fluorinating agent into contact with a manganese compound at a temperature of 50 to 250° C. is carried out and then a step (2) of bringing a fluorinating agent into contact with manganese fluoride obtained in the step (1) at a temperature of 250 to 450° C. is carried out. Based on the finding, the present invention has been accomplished.

That is to say, the present invention relates to a process for producing manganese fluoride that is stated in the following [1] to [11].

[1] A process for producing manganese fluoride, comprising a step (1) of allowing a manganese compound to react with a fluorinating agent at a temperature of 50 to 250° C. and a step (2) of further allowing a product obtained in the step (1) to react with a fluorinating agent at a temperature of 250 to 450° C.

[2] The process for producing manganese fluoride as stated in the above [1], which comprises, prior to the step (1), a step of drying the manganese compound at a temperature of not lower than 100° C.

[3] The process for producing manganese fluoride as stated in the above [1] or [2], wherein the step (1) comprises a step of feeding a fluorinating agent at a constant rate to a container charged with a manganese compound until the pressure in the container becomes constant from reduced pressure, to bring the fluorinating agent into contact with the manganese compound.

[4] The process for producing manganese fluoride as stated in any one of the above [1] to [3], wherein the step (2) comprises a step of feeding a fluorinating agent at a constant rate to a container charged with a manganese compound until the pressure in the container becomes constant from reduced pressure, to bring the fluorinating agent into contact with the manganese compound.

[5] The process for producing manganese fluoride as stated in any one of the above [1] to [4], wherein the step (1) comprises a step of removing impurities under reduced pressure.

[6] The process for producing manganese fluoride as stated in any one of the above [1] to [5], wherein the step (2) comprises a step of removing impurities under reduced pressure.

[7] The process for producing manganese fluoride as stated in any one of the above [1] to [6], wherein the manganese compound is at least one compound selected from the group consisting of $MnF_2$, $MnCO_3$, $MnO$ and hydrates thereof.

[8] The process for producing manganese fluoride as stated in the above [7], wherein the manganese compound is $MnF_2$ or a hydrate thereof.

[9] The process for producing manganese fluoride as stated in any one of the above [1] to [8], wherein the fluorinating agent is at least one compound selected from the group consisting of $F_2$, $ClF$ and $ClF_3$.

[10] The process for producing manganese fluoride as stated in the above [9], wherein the fluorinating agent is $F_2$.

[11] The process for producing manganese fluoride as stated in any one of the above [1] to [10], wherein the manganese fluoride obtained in said process is $MnF_x$ (x=3–4).

[12] The process for producing manganese fluoride as stated in any one of the above [1] to [11], wherein the reaction of the step (1) is carried out at a temperature of 100 to 200° C.

[13] The process for producing manganese fluoride as stated in any one of the above [1] to [12], wherein the reaction of the step (2) is carried out at a temperature of 250 to 400° C.

[14] The process for producing manganese fluoride as stated in any one of the above [1] to [13], wherein the raction of the step (1) and the step (2) is carried out with pulverizing a reaction product.

According to the present invention, a reaction of a manganese compound with a fluorinating agent can be carried out under the conditions of low temperature and low pressure, and manganese fluoride can be easily and inexpensively produced on a mass scale without going through steps of sublimation and solidification.

Figure 1:
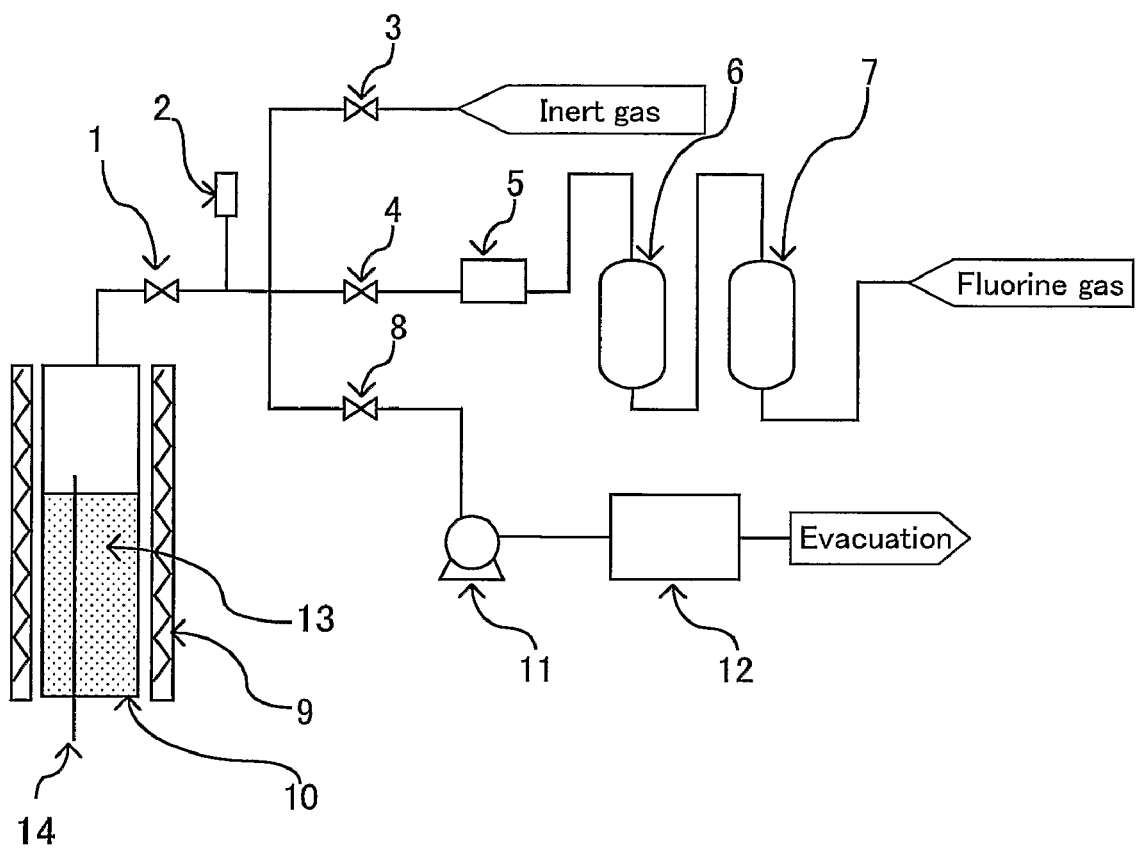
FIG. 1 is a schematic view showing an example of a production apparatus used in the process for producing manganese fluoride of the present invention.

1: stop valve
2: pressure gauge
3: stop valve
4: stop valve
5: mass flow controller
6: cushion tank
7: NaF tank
8: stop valve
9: heater
10: Ni reaction vessel
11: vacuum pump
12: elimination device
13: $Mn_xF_y$ (y/x=2-4)
14: thermocouple

BEST MODE FOR CARRYING OUT THE INVENTION

The process for producing manganese fluoride of the present invention is described in detail hereinafter.

The process for producing manganese fluoride of the invention comprises carrying out a step (1) of allowing a fluorinating agent to contact and react with a manganese compound at a temperature of 50 to 250° C. and then carrying out a step (2) of further allowing a fluorinating agent to contact and react with a product obtained in the step (1) at a temperature of 250 to 450° C.

As the manganese compound for use in the invention, a commercially available manganese compound is employable. Examples of the manganese compounds include $MnF_2$, $MnCO_3$ and MnO. Of these, $MnF_2$ is preferably employed because replacement of an anion with fluorine is unnecessary.

Although the manganese compound may be a hydrate, a by-product HF formed by the reaction with a fluorine gas sometimes inhibits synthesis of manganese fluoride, so that it is desirable to dry the hydrate at a temperature of not lower than 100° C., preferably not lower than 200° C., particularly preferably not lower than 300° C., before the hydrate is brought into contact with a fluorinating agent. The drying method is, for example, a method of drying it in a stream of an inert gas (He, $N_2$ or the like) having a dew point of not higher than −70° C. or a method of heating it under the conditions of reduced pressure.

The fluorinating agent for use in the invention has only to be a fluorinating agent capable of increasing a valence of manganese, and examples of the fluorinating agents include $F_2$, ClF and $ClF_3$. Of these, $F_2$ is preferably employed because pure fluorination only can be promoted.

Next, a process for producing manganese fluoride using $MnF_2$ as a manganese compound and $F_2$ as a fluorinating agent is described in detail.

Since manganese fluoride does not exist as a monomolecule, $MnF_3$ state and $MnF_4$ state are present as a mixture in its crystal structure. Therefore, in the case where 50% of $MnF_3$ state and 50% of $MnF_4$ state are contained in the crystal structure, such manganese fluoride is expressed as $MnF_{3.5}$ in this specification. The valence is sometimes expressed as a number containing a decimal point in this way, so that manganese fluoride is expressed as $MnF_x$ (x=3-4) in this specification.

The purity of $MnF_2$ used is not specifically restricted. However, if the purity is too low, fluorination is sometimes inhibited by impurities, so that the purity of $MnF_2$ is desired to be preferably not less than 90%, more preferably not less than 95%, particularly preferably not less than 98%. The purity of $F_2$ used is not specifically restricted either. However, if the purity is too low, fluorination is sometimes inhibited by impurities similarly to the $MnF_2$, so that the purity of $F_2$ is desired to be preferably not less than 95%, more preferably not less than 99%, particularly preferably not less than 99.9%. If HF is present in $F_2$, a fused salt of manganese fluoride is liable to be formed, and therefore, the HF concentration in $F_2$ is desired to be preferably not more than 1%, more preferably not more than 0.1%, particularly preferably not more than 0.01%.

The $MnF_2$ desirably has an average particle diameter of preferably not more than 10 μm, more preferably not more than 1 μm, particularly preferably not more than 0.1 μm, because as the particle diameter is decreased, the surface area is increased to enhance efficiency of the fluorination.

$MnF_2$ is usually manufactured industrially by the reaction of $MnCO_3$ with HF ($MnCO_3+2HF\rightarrow MnF_2+CO_2+H_2O$). By the use of such anhydrous $MnF_2$, manganese fluoride $MnF_x$ (x=3-4) can be produced without going through steps of sublimation and solidification, so that as compared with the conventional process, manganese fluoride can be more inexpensively produced without using any complicated apparatus.

In the process for producing manganese fluoride of the invention, first, $MnF_2$ is placed in a reaction vessel and heated under reduced pressure to perform initial drying. This initial drying is carried out for the purpose of removing a trace amount of water of crystallization remaining after the production of $MnF_2$ or removing moisture adhering to the surfaces of $MnF_2$ crystals. In this case, the reduced pressure is discontinued, then the reaction vessel is pressurized with an inert gas (He, $N_2$ or the like) having a dew point of not higher than −70° C., and then the reaction vessel is returned to reduced pressure again, whereby the water content can be efficiently removed. As the number of times to repeat these operations is increased, a larger quantity of water content can be removed. However, the water content can be sufficiently removed by repeating these operations approximately 5 to 10 times. If the temperature in these operations is not lower than 100° C., the water content can be removed. However, when these operations are performed at a temperature of 300 to 400° C., the water content can be more efficiently removed, so that such a temperature is preferable.

After the water content is removed from $MnF_2$ in the above manner, $MnF_2$ is allowed to react with $F_2$ to synthesize manganese fluoride, and for the reaction, the reaction vessel is first evacuated (<1 kPa), and then $F_2$ is introduced into the reaction vessel. If the fluorine gas is rapidly fed to the reaction vessel to raise the pressure in the reaction vessel to atmospheric pressure or higher, the reaction of $MnF_2$ with $F_2$ proceeds instantly to fuse and solidify the manganese compound, so that contact of $F_2$ with the interior of the solidified manganese fluoride becomes infeasible and the reaction does not proceed further. As a result, the reaction rate is sometimes lowered markedly. On this account, $F_2$ is slowly fed to the evacuated reaction vessel with controlling a flow rate, whereby fusion can be prevented and fluorination can be continued.

The reaction of $MnF_2$ with $F_2$ in the step (1) is desirably carried out at a temperature of 50 to 250° C., more preferably 100 to 200° C. If the reaction temperature in the step (1) is too low, the reaction rate is lowered in some cases. If the reaction temperature is too high, $MnF_4$ is formed on the crystal surface, and the reaction does not proceed further in some cases.

The rate to feed $F_2$ to the vacuum vessel (evacuated vessel) at the above temperature is desired to be preferably not more than 1 mol/hr, more preferably not more than 0.5 mol/hr, particularly preferably not more than 0.1 mol/hr, based on 1 mol of the manganese compound present in the reaction vessel. In the initial stage of the reaction, the rate of the reaction of $MnF_2$ with $F_2$ is lower than the feed rate of $F_2$, so that the pressure in the reaction vessel slowly rises, and when it becomes equal to the feeding pressure, the pressure in the reaction vessel becomes constant. In the latter stage of the reaction wherein the pressure is constant, $F_2$ is fed as much as reacted with manganese fluoride. The feed rate of $F_2$ is preferably kept constant within the above range until the pressure becomes constant.

The pressure for the fluorination in the step (1) is not specifically restricted. However, if the fluorination is carried out at a high pressure, danger in handling of a fluorine gas is increased, and an expensive pressure-resistant reaction vessel is necessary, so that the fluorination is desirably carried out at a pressure as low as possible. More specifically, the pressure is desired to be preferably not more than 2 MPa, more preferably not more than 1 MPa, particularly preferably not more than 0.5 MPa.

Although the reason why fusion of manganese fluoride can be prevented by controlling the feed rate of $F_2$ is not clear, it is presumed that in case of rapid feeding, $MnF_4$ is instantly formed on the surface of $MnF_2$ crystal, and by a heat of reaction generated at that time, $MnF_4$ is fused and agglomerated.

In the synthesis of manganese fluoride in the step (1), fluorination is carried out using $MnF_2$ having been subjected to the initial drying. Even after the drying, however, impurities in the form of Mn—OH or the like sometimes remain depending upon the purity of $MnF_2$, and in this case, there is a possibility of occurrence of reaction of $F_2$ with the impurities to form impurities such as HF. Therefore, it is preferable to remove the impurities by temporarily stopping feeding of $F_2$ in the course of the reaction and thereby changing the pressure in the reaction vessel to reduced pressure. Although the number of times to carry out pressure reduction depends upon the amount of the impurities formed, this operation has only to be carried out approximately once, or may be carried out twice or more depending upon the amount of the impurities formed.

When the reaction of the step (1) is continued, absorption of a fluorine gas by manganese fluoride present in the reaction vessel stops and the reaction does not proceed further. At this time, if the manganese fluoride synthesized in the step (1) is analyzed, this manganese fluoride proved to be $MnF_x$ (x≈3), so that it can be seen that the synthesized compound is a compound wherein $MnF_2$ has been converted into almost $MnF_3$. Even if the step (1) is continuously carried out, the reaction to convert $MnF_3$ into a further fluorinated compound hardly proceeds, and therefore, the step (2) is carried out subsequently.

In order to further promote fluorination, the reaction temperature in the step (2) is desired to be in the range of preferably 250 to 450° C., more preferably 250 to 400° C. By thus raising the reaction temperature, the fluorination further proceeds. In the $MnF_x$ synthesized in the step (1), x is sometimes less than 3, and in this case, there is a possibility of fusion and solidification of manganese fluoride in the step (2) because of a large quantity of heat of the initial reaction. In the step (2), therefore, it is preferable to raise the reaction temperature stepwise from 250° C.

By raising the reaction temperature stepwise as described above, absorption of a fluorine gas by manganese fluoride present in the reaction vessel starts again, and the fluorination can be continuously carried out at the same pressure as that of the latter stage of the reaction in the step (1). It is preferable to carry out the step (2) after the impurities which may possibly form in trace amounts are removed under the conditions of reduced pressure at the time the step (1) is finished. Further, in order to avoid a phenomenon that the reaction occurs instantly on the surface of the manganese fluoride compound to make the powder fused, it is preferable to slowly introduce $F_2$ into the vacuum vessel with controlling a flow rate to perform fluorination in the step (2), similarly to the step (1).

The feed rate of $F_2$ in the step (2) is desired to be preferably not more than 1 mol/hr, more preferably not more than 0.5 mol/hr, particularly preferably not more than 0.1 mol/hr, based on 1 mol of the manganese compound present in the reaction vessel of reduced pressure. In the initial stage of the reaction of the step (2), the rate of the reaction of manganese fluoride with $F_2$ is lower than the feed rate of $F_2$, so that the pressure in the reaction vessel slowly rises, and when it becomes equal to the feeding pressure, the pressure in the reaction vessel becomes constant, similarly to the step (1). In the latter stage of the reaction wherein the pressure is constant, $F_2$ is fed as much as reacted with manganese fluoride. The feed rate of $F_2$ is preferably kept constant within the above range until the pressure becomes constant.

The pressure for the fluorination in the step (2) is not specifically restricted similarly to the step (1). However, if the fluorination is carried out at a high pressure, danger in handling of a fluorine gas is increased, and an expensive pressure-resistant reaction vessel is necessary, so that the fluorination is desirably carried out at a pressure as low as possible. More specifically, the pressure is desired to be preferably not more than 2 MPa, more preferably not more than 1 MPa, particularly preferably not more than 0.5 MPa.

In the step (2), fluorination is carried out under the conditions of higher temperatures, and consequently, there is a possibility of forming impurities such as HF from the impurities that have not reacted in the step (1). Therefore, it is desirable to remove these impurities by temporarily stopping feeding of $F_2$ and thereby changing the pressure in the reaction vessel to reduced pressure. Although the number of times to carry out pressure reduction depends upon the amount of the impurities formed, this operation has only to be carried out approximately once, or may be carried out twice or more depending upon the amount of the impurities formed.

In the step (1) and the step (2), the reaction may be carried out with pulverizing the reaction product.

By performing the production process of the invention, at least $MnF_x$ wherein x is 3 to 4, more specifically, $MnF_x$ wherein x is 3.5 to 4, which is preferably used as a fluorine generator, can be synthesized from $MnF_2$.

There is no specific limitation on the shape of the reaction vessel for use in the invention, but a reaction vessel that is extremely long and narrow or short and thick takes up space and is undesirable. In case of a cylindrical reaction vessel, therefore, a ratio of a height of the agent charged to a diameter of the reaction vessel (height of the agent charged/diameter of the reaction vessel) is preferably in the range of about 1.5 to 15.

The valence of manganese in this specification was determined in the following manner. Manganese fluoride was dissolved in a nitric acid aqueous solution or a hydrochloric acid aqueous solution. With respect to manganese, ICP analysis was carried out, and with respect to fluorine, analysis by ion chromatograph was carried out. Then, a ratio of manganese to fluorine in the manganese fluoride was calculated.

By heating the manganese fluoride obtained by the production process of the invention in a Ni container, a high-purity fluorine gas having a purity of not less than 99.95% can be generated. The purity of the fluorine gas can be determined by analyzing the amount of impurities contained in the fluorine gas by means of gas chromatography and FT-IR.

EXAMPLES

The present invention is further described with reference to the following examples, but it should be construed that the invention is in no way limited to those examples.

In FIG. 1, an example of a production apparatus used in the process for producing manganese fluoride of the present invention is schematically shown. Using such a production apparatus as shown in FIG. 1, the following examples and comparative examples were carried out.

Example 1

In a 0.1 liter Ni reaction vessel 10 (φ30 mm×150 mm), 60 g (0.65 mol) of $MnF_2$ was charged. The reaction vessel 10 was heated by an electric heater 9 and evacuated to reduce the pressure to not more than 1 kPa by means of a vacuum pump 11, followed by drying for 1 hour. In the course of drying, evacuation was temporarily stopped, then He was fed to the reaction vessel 10 by means of a valve 3 until the pressure in the reaction vessel became 0.1 MPa (gauge pressure), and evacuation was carried out again. These operations were performed 5 times. Thereafter, to the reaction vessel 10 having been evacuated to a pressure of not more than 1 kPa at 150° C., a fluorine gas ($F_2$) was fed at a rate of 50 ml/min (0.13 mol/hr) by means of a mass flow controller 5 to perform reaction of the step (1). The pressure gradually rose and became constant at 0.4 MPa that was equal to the feeding pressure, and absorption of a fluorine gas by manganese fluoride present in the reaction vessel continued.

After the passage of 360 minutes from the initiation of the reaction, feeding of a fluorine gas was temporarily stopped, and evacuation was carried out to reduce the pressure in the reaction vessel to not more than 1 kPa. Then, a fluorine gas was fed again at a rate of 50 ml/min (0.13 mol/hr) by means of a mass flow controller 5. The pressure rose up to 0.4 MPa that was equal to the feeding pressure, and absorption of a fluorine gas by manganese fluoride present in the reaction vessel was again started. When absorption of a fluorine gas by manganese fluoride was not observed, the reaction was finished.

Figure 2:
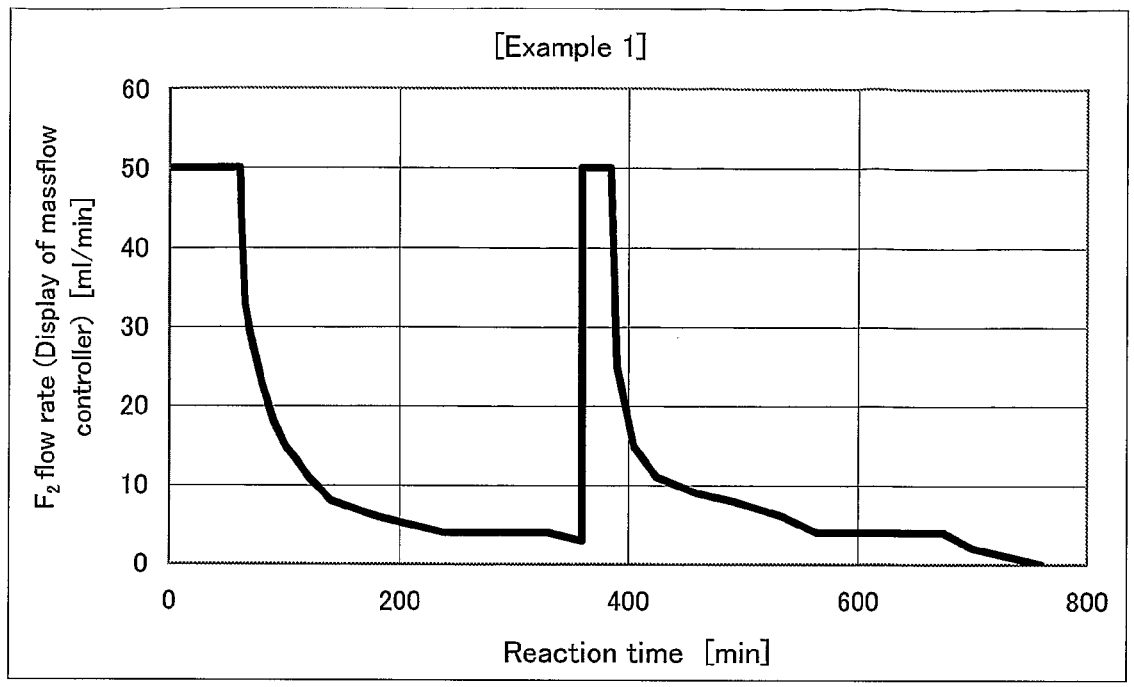
FIG. 2 is a graph showing a change of a flow rate of a fluorine gas in Example 1.
Figure 3:
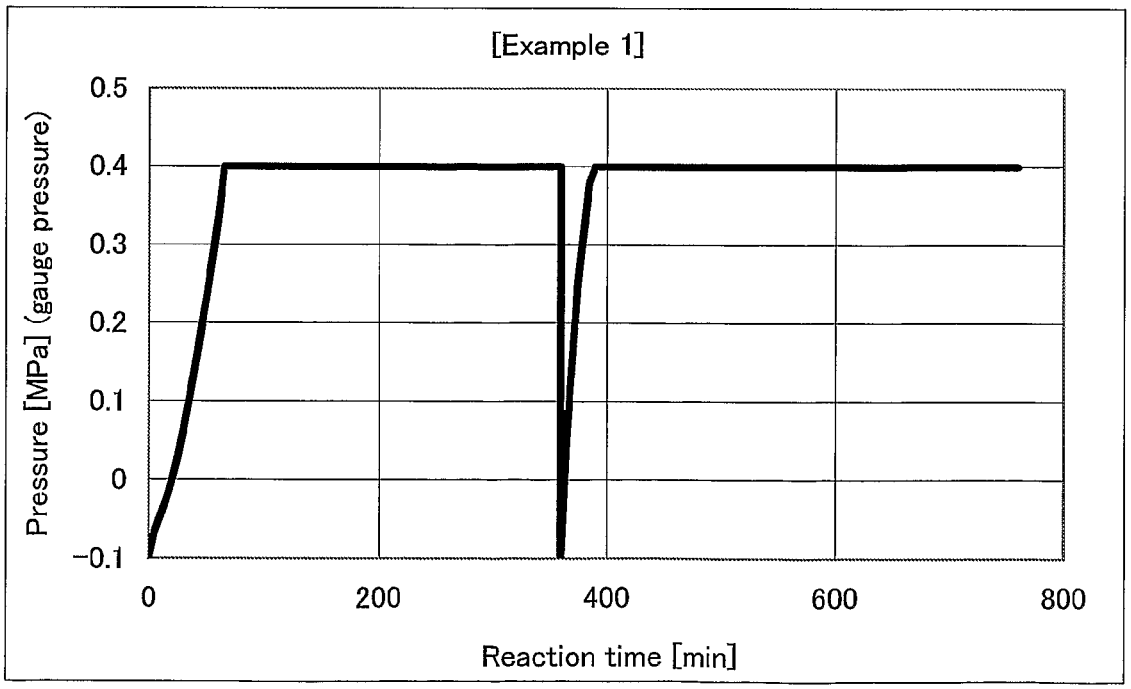
FIG. 3 is a graph showing a change of a pressure in Example 1.

A change of a fluorine gas flow rate and a change of a pressure are shown in FIG. 2 and FIG. 3, respectively. A valence of the resulting manganese fluoride was determined from analytical values of ICP and ion chromatograph, and as a result, the resulting manganese fluoride proved to be $MnF_{2.96}$.

Example 2

Subsequently to Example 1, the step (2) was carried out.

First, feeding of a fluorine gas was stopped, and evacuation was carried out by a vacuum pump 11 to reduce the pressure in the reaction vessel to not more than 1 kPa. Thereafter, to the reaction vessel 10 having been evacuated to a pressure of not more than 1 kPa at 280° C., a fluorine gas ($F_2$) was fed at a rate of 200 ml/min (0.54 mol/hr) by means of a mass flow controller 5 to perform reaction of the step (2). When absorption of a fluorine gas by manganese fluoride was not observed, the reaction was finished.

Figure 4:
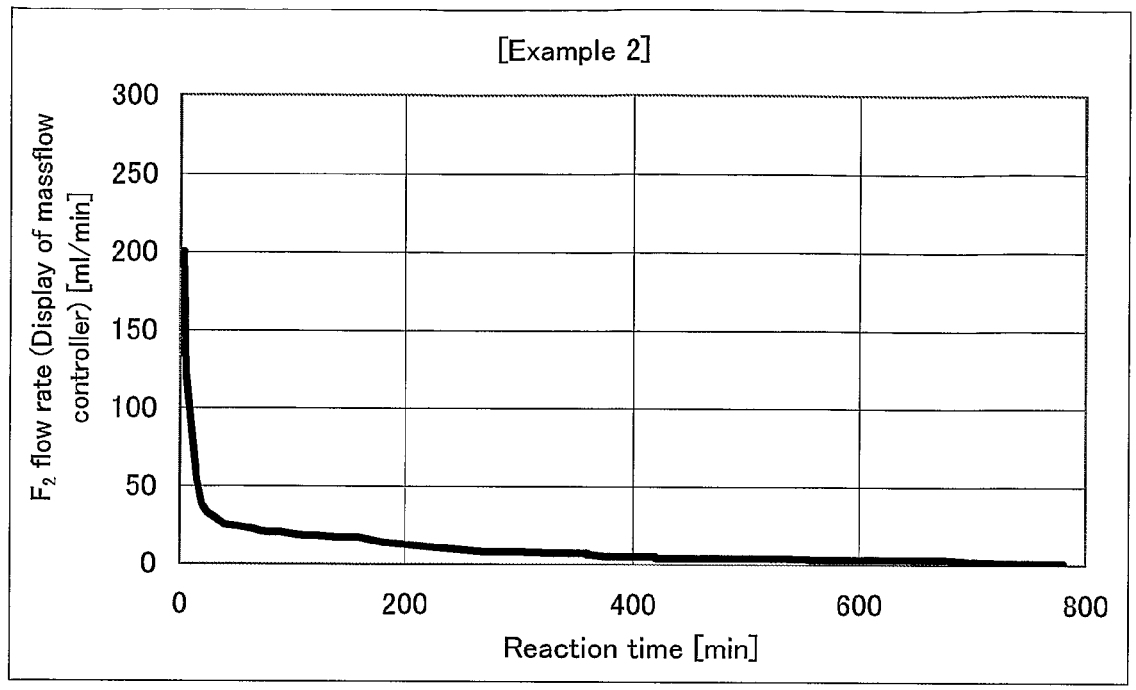
FIG. 4 is a graph showing a change of a flow rate of a fluorine gas in Example 2.
Figure 5:
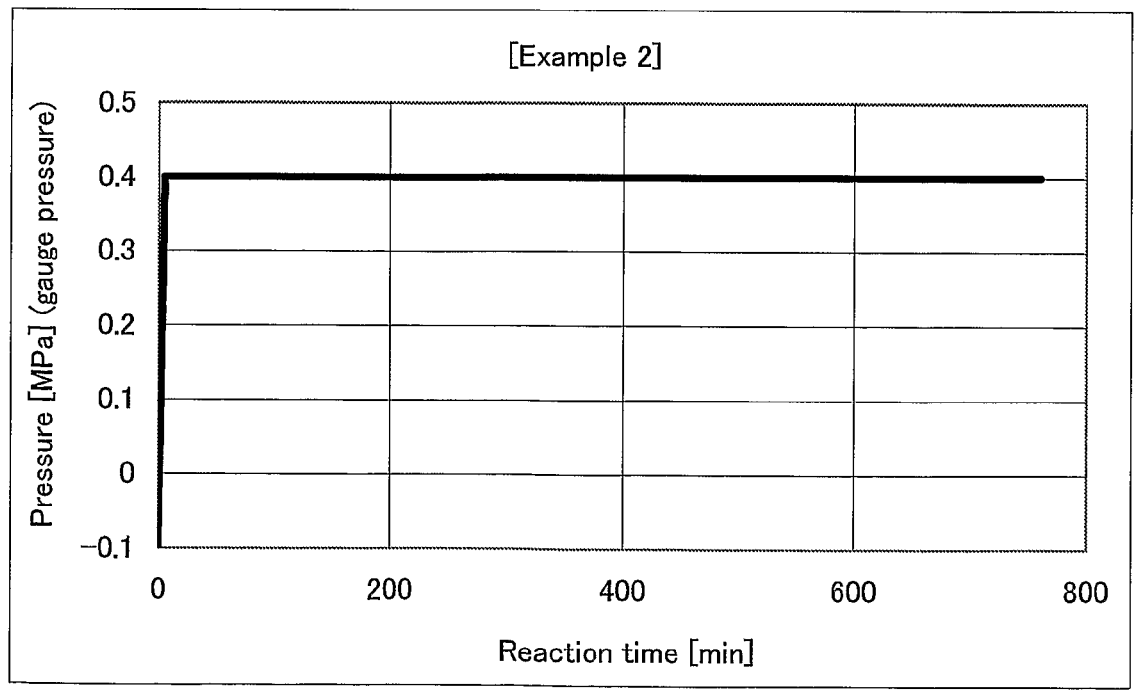
FIG. 5 is a graph showing a change of a pressure in Example 2.

A change of a fluorine gas flow rate and a change of a pressure are shown in FIG. 4 and FIG. 5, respectively. A valence of the resulting manganese fluoride was determined from analytical values of ICP and ion chromatograph, and as a result, the resulting manganese fluoride proved to be $MnF_{3.91}$.

Comparative Example 1

In a 0.1 liter Ni reaction vessel 10 (φ30 mm×150 mm), 60 g (0.65 mol) of $MnF_2$ was charged. The reaction vessel 10 was heated by an electric heater 9 and evacuated to reduce the pressure to not more than 1 kPa by means of a vacuum pump 11, followed by drying for 1 hour. In the course of drying, evacuation was temporarily stopped, then He was fed to the reaction vessel 10 by means of a valve 3 until the pressure in the reaction vessel became 0.1 MPa (gauge pressure), and evacuation was carried out again. These operations were performed 5 times. Thereafter, to the reaction vessel 10 having been evacuated to a pressure of not more than 1 kPa at 300° C., a fluorine gas ($F_2$) was fed at a rate of 50 ml/min (0.13 mol/hr) by means of a mass flow controller 5 to perform fluorination reaction. After the initiation of the reaction, the pressure gradually rose and became constant at 0.4 MPa that was equal to the feeding pressure.

After the passage of 360 minutes from the initiation of the reaction, feeding of a fluorine gas was temporarily stopped, and evacuation was carried out to reduce the pressure in the reaction vessel to not more than 1 kPa. Then, a fluorine gas was fed at a rate of 50 ml/min (0.13 mol/hr) by means of a mass flow controller 5. The pressure rose up to 0.4 MPa that was equal to the feeding pressure, and the manganese fluoride present in the reaction vessel hardly absorbed a fluorine gas, so that the reaction was finished.

Figure 6:
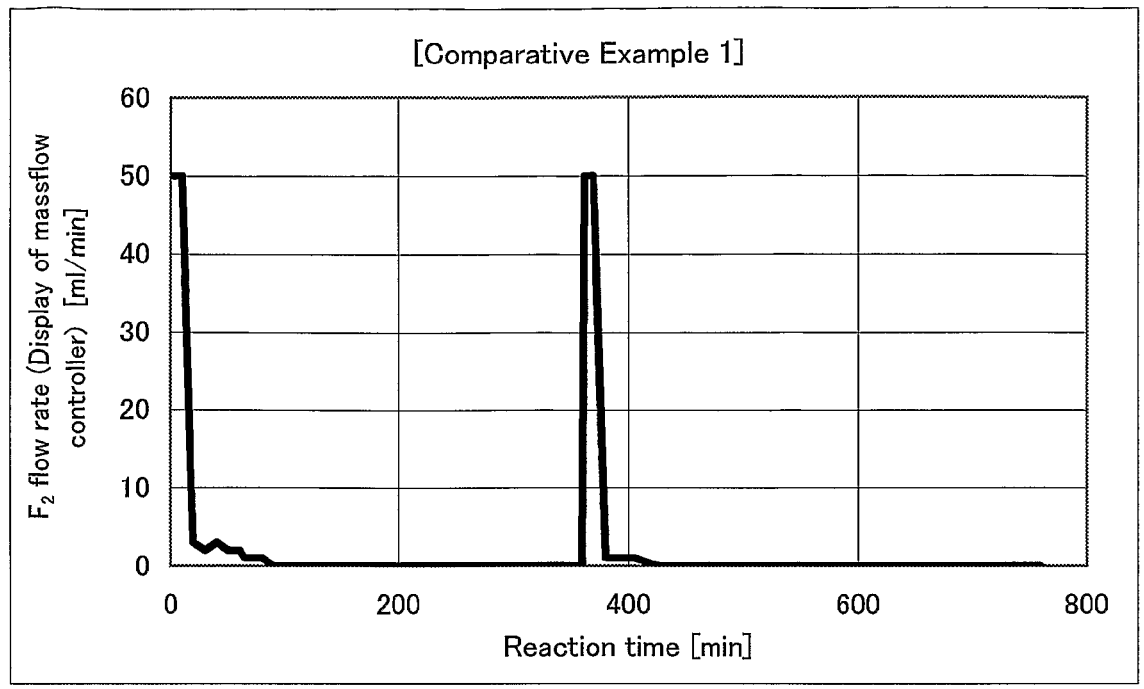
FIG. 6 is a graph showing a change of a flow rate of a fluorine gas in Comparative Example 1.
Figure 7:
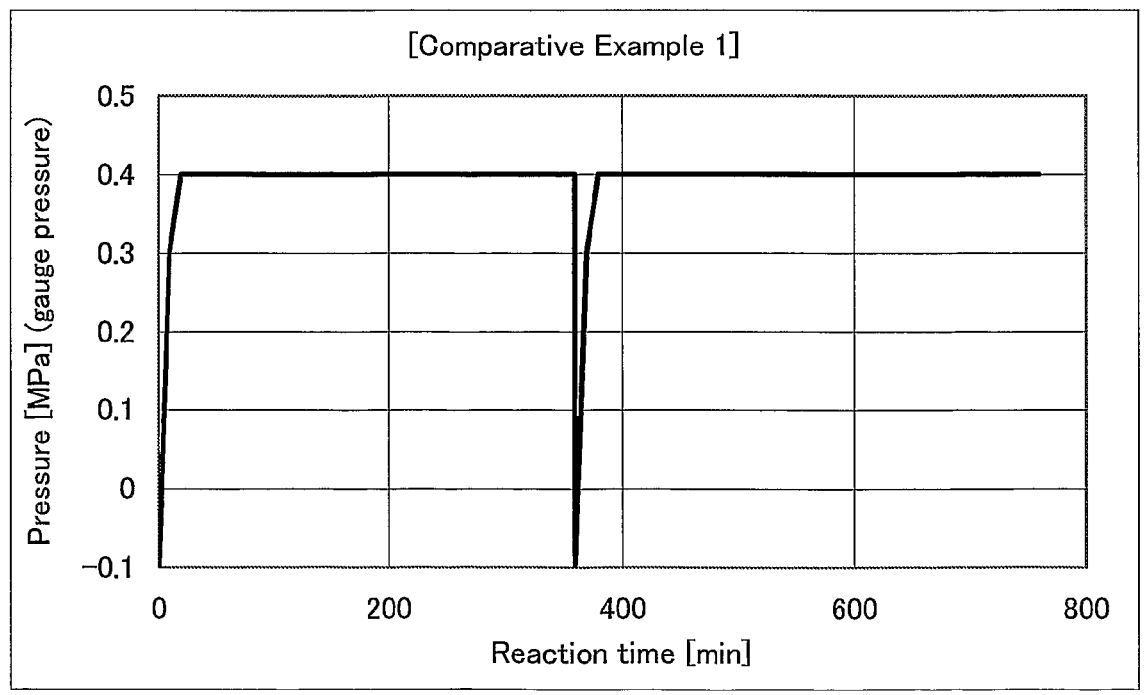
FIG. 7 is a graph showing a change of a pressure in Comparative Example 1.

A change of a fluorine gas flow rate and a change of a pressure are shown in FIG. 6 and FIG. 7, respectively. A valence of the resulting manganese fluoride was determined from analytical values of ICP and ion chromatograph, and as a result, the resulting manganese fluoride proved to be $MnF_{2.11}$.

It can be seen from the above results that when the initial temperature of the reaction was 300° C., fluorination reaction did not proceed sufficiently as compared with Example 1.

The invention claimed is:

1. A process for producing manganese fluoride, comprising:
   a step (1) of reacting a manganese compound with a fluorinating agent at a temperature of 50 to 250° C. by feeding the fluorinating agent to a container containing the manganese compound at a rate at which fusion and solidification of the manganese compound does not occur to obtain a manganese product that is a compound that contains manganese and fluorine, and
   a step (2) of further reacting the product obtained in the step (1) with a fluorinating agent at a temperature of 250 to 450° C. to obtain manganese fluoride.

2. The process for producing manganese fluoride as claimed in claim 1, which comprises, prior to the step (1), a step of drying the manganese compound at a temperature of not lower than 100° C.

3. The process for producing manganese fluoride as claimed in claim 1, wherein the step (1) comprises a step of evacuating the container to a reduced pressure and the step of feeding the fluorinating agent is at a constant rate to the container having the reduced pressure and containing the manganese compound until the pressure in the container becomes constant from the reduced pressure, to bring the fluorinating agent into contact with the manganese compound.

4. The process for producing manganese fluoride as claimed in claim 1, wherein the step (2) comprises a step of evacuating the container to reduced pressure and a step of feeding the fluorinating agent at a constant rate to the container having the reduced pressure and containing the manganese product obtained in step (1) until the pressure in the container becomes constant from the reduced pressure, to bring the fluorinating agent into contact with the manganese product.

5. The process for producing manganese fluoride as claimed in claim 1, wherein the step (1) comprises a step of removing impurities from the manganese product under reduced pressure.

6. The process for producing manganese fluoride as claimed in claim 1, wherein the step (2) comprises a step of removing impurities from the manganese fluoride under reduced pressure.

7. The process for producing manganese fluoride as claimed in claim 1, wherein the manganese compound is at least one compound selected from the group consisting of $MnF_2$, $MnCO_3$, $MnO$ and hydrates thereof.

8. The process for producing manganese fluoride as claimed in claim 7, wherein the manganese compound is $MnF_2$ or a hydrate thereof.

9. The process for producing manganese fluoride as claimed in claim 1, wherein the fluorinating agent is at least one compound selected from the group consisting of $F_2$, $ClF$ and $ClF_3$.

10. The process for producing manganese fluoride as claimed in claim 9, wherein the fluorinating agent is $F_2$.

11. The process for producing manganese fluoride as claimed in claim 1, wherein the manganese fluoride obtained in said process step (2) is $MnF_x$ (x=3–4).

12. The process for producing manganese fluoride as claimed in claim 1, wherein the reaction of the step (1) is carried out at a temperature of 100 to 200° C.

13. The process for producing manganese fluoride as claimed in claim 1, wherein the reaction of the step (2) is carried out at a temperature of 250 to 400° C.

* * * * *